(12) United States Patent
Kabagambe et al.

(10) Patent No.: US 10,240,064 B2
(45) Date of Patent: Mar. 26, 2019

(54) CURABLE COMPOSITIONS AND THEIR USE AS COATINGS AND FOOTWEAR COMPONENTS

(71) Applicant: PPG INDUSTRIES OHIO, INC., Cleveland, OH (US)

(72) Inventors: Benjamin Kabagambe, Pittsburgh, PA (US); Cynthia Kutchko, Pittsburgh, PA (US); Christina Winters, Freeport, PA (US); Edward Richard Millero, Jr., Gibsonia, PA (US); Jonathan Breon, Pittsburgh, PA (US); Susan Fundy Donaldson, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/346,853

(22) Filed: Nov. 9, 2016

(65) Prior Publication Data

US 2018/0127617 A1    May 10, 2018

(51) Int. Cl.

| | |
|---|---|
| *C09D 175/08* | (2006.01) |
| *C09D 7/12* | (2006.01) |
| *C08G 18/12* | (2006.01) |
| *C08G 18/75* | (2006.01) |
| *C08G 18/50* | (2006.01) |
| *C08G 18/24* | (2006.01) |
| *A43B 5/00* | (2006.01) |
| *A43B 3/30* | (2006.01) |
| *A43B 3/12* | (2006.01) |
| *A43B 3/10* | (2006.01) |
| *A43B 3/02* | (2006.01) |
| *A43B 23/02* | (2006.01) |
| *A43B 13/18* | (2006.01) |
| *A43B 13/20* | (2006.01) |
| *C09D 7/40* | (2018.01) |
| *C09D 7/61* | (2018.01) |
| *C09D 7/63* | (2018.01) |
| *C08G 18/48* | (2006.01) |
| *C08G 18/66* | (2006.01) |
| *C08G 18/73* | (2006.01) |
| *C08G 18/79* | (2006.01) |
| *C08G 18/10* | (2006.01) |

(Continued)

(52) U.S. Cl.
CPC .............. *C09D 175/08* (2013.01); *A43B 3/02* (2013.01); *A43B 3/101* (2013.01); *A43B 3/12* (2013.01); *A43B 3/30* (2013.01); *A43B 5/00* (2013.01); *A43B 13/189* (2013.01); *A43B 13/20* (2013.01); *A43B 23/0225* (2013.01); *C08G 18/10* (2013.01); *C08G 18/12* (2013.01); *C08G 18/242* (2013.01); *C08G 18/246* (2013.01); *C08G 18/3234* (2013.01); *C08G 18/3821* (2013.01); *C08G 18/4825* (2013.01); *C08G 18/5021* (2013.01); *C08G 18/5024* (2013.01); *C08G 18/6685* (2013.01); *C08G 18/73* (2013.01); *C08G 18/755* (2013.01); *C08G 18/79* (2013.01); *C09D 7/61* (2018.01); *C09D 7/63* (2018.01); *C09D 7/69* (2018.01); *C09D 175/02* (2013.01); *C08G 2410/00* (2013.01); *C08K 5/05* (2013.01); *C08K 2003/2227* (2013.01); *C08K 2003/2241* (2013.01); *C08K 2201/005* (2013.01)

(58) Field of Classification Search
CPC ...... C08G 18/10; C08G 18/12; C08G 18/242; C08G 18/246; C08G 18/3234; C08G 18/3821; C08G 18/4825; C08G 18/5021; C08G 18/5024; C08G 18/6685; C08G 18/73; C08G 18/755; C08G 18/79; C08G 2410/00; C09D 175/08; C09D 175/02; C09D 7/61; C09D 7/63; C09D 7/69; C08K 3/22; C08K 2003/2227; C08K 2003/2241; C08K 2201/005; C08K 5/05; A43B 1/00; A43B 13/189; A43B 13/20; A43B 23/0225; A43B 3/02; A43B 3/101; A43B 3/12; A43B 3/30; A43B 5/00
USPC ......... 428/423.1, 425.1, 425.6, 425.8, 425.9; 528/48
See application file for complete search history.

(56) References Cited

U.S. PATENT DOCUMENTS 6,179,887 B1 * 1/2001 Barber, Jr. ............. A46B 3/005
                                                                451/527
8,691,929 B2    4/2014 Millero, Jr. et al.
(Continued)

FOREIGN PATENT DOCUMENTS

| EP | 1757663 A2 | 2/2007 |
|---|---|---|
| JP | 2008040000 A | 2/2008 |

*Primary Examiner* — Thao T Tran
(74) *Attorney, Agent, or Firm* — Krisanne Shideler

(57) ABSTRACT

Curable compositions are provided comprising:
(a) an isocyanate-functional prepolymer having a weight average molecular weight of 4000 to 15,000;
(b) a curing agent comprising a mixture of polyamines, wherein at least one polyamine has an amine equivalent weight of 125 to 250; and
(c) an abrasion resistant additive comprising organic and inorganic particles. The isocyanate-functional prepolymer is (i) a reaction product of a polyisocyanate and a polyamine having primary and/or secondary amino groups; and/or (ii) a reaction product of a polyisocyanate and a polyol. Upon application of the composition to a substrate as a coating and after curing to form a coated substrate, the coated substrate demonstrates a coating loss of less than 0.33 cm³ after being subjected to 1000 cycles of a TABER Abrasion Test using S-42 sandpaper strips and two 1000 gram weights. Coated substrates and footwear components prepared from the compositions are also disclosed.

19 Claims, No Drawings

(51) Int. Cl.
*C09D 175/02* (2006.01)
*C08G 18/32* (2006.01)
*C08G 18/38* (2006.01)
C08K 5/05 (2006.01)
C08K 3/22 (2006.01)

(56) References Cited

U.S. PATENT DOCUMENTS

| | | |
|---|---|---|
| 8,822,594 B2 | 9/2014 | Yakulis et al. |
| 2007/0160851 A1 | 7/2007 | Barancyk et al. |
| 2012/0141774 A1* | 6/2012 | Abrami ............ C09D 175/04 428/323 |
| 2014/0331520 A1 | 11/2014 | Yakulis, Jr. et al. |
| 2017/0058451 A1 | 3/2017 | Smith et al. |

* cited by examiner

CURABLE COMPOSITIONS AND THEIR USE AS COATINGS AND FOOTWEAR COMPONENTS

FIELD OF THE INVENTION

The present invention is directed to curable compositions, and to coated substrates and footwear components that include these curable compositions.

BACKGROUND

Curable compositions are often used as coatings in a wide variety of industries. Such industries may include but are not limited to landcraft such as cars, trucks, sport utility vehicles, motorcycles; watercraft such as boats, ships and submarines; aircraft such as airplanes and helicopters, industrial such as commercial equipment and structures including walls and roofs; construction such as construction vehicles and structures including walls and roofs, military such as military vehicles, and military structures including walls and roofs, for example, ammunition cases and battery enclosures; and the like.

In these industries, coatings serve a variety of purposes such as protecting various components against damage due to corrosion, abrasion, impact, chemicals, ultraviolet light, flame and heat, and other environmental exposure. Accordingly, considerable efforts have been expended to develop coating compositions with improved properties.

Curable compositions can also be used in the footwear industry. Footwear, such as a shoe, is generally divided into two parts, an upper and a sole. The upper is the portion of the footwear designed to comfortably enclose the foot, while the sole, which typically includes an insole, optionally a midsole, and an outsole, is the portion of the footwear designed to provide traction, protection, cushioning, and/or a durable wear surface.

The upper is typically comprised of many different components, often made of different materials. Such materials include, for example, natural leather, synthetic leather, vinyl, and fabric such as nylon; other textiles may also be used. Many of the upper components, particularly the "toe", can experience wear and/or abrasion during even normal use of the shoe.

Similarly, the sole often includes different components made of different materials. Midsoles are typically made of foam, such as ethylene vinyl acetate (EVA) foam or polyurethane, such as TPU, foam. These materials compress resiliently under an applied load, such as the forces generated by the feet and legs during physical activity. Many shoes, particularly athletic shoes, include filled cushioning devices or bladders within another shoe component, such as a midsole, outsole and the like. The bladders can be inflatable inserts made of polymeric materials that are resistantly compressible to provide additional cushioning to the wearer of the footwear. These bladders can be filled, for example, with a gel, water or other fluid, such as air or nitrogen. Outsoles are often made of synthetic and/or natural rubbers, such as silica-filled rubber compositions. The outsole can also experience wear and/or abrasion during even normal use of a shoe.

Improved resistance and/or durability of shoe components to wear, abrasion, and other damage is therefore desired.

SUMMARY OF THE INVENTION

The present invention is directed to a curable composition comprising: (a) an isocyanate-functional prepolymer having a weight average molecular weight of 4000 to 15,000, wherein the isocyanate-functional prepolymer comprises (i) a reaction product of a polyisocyanate and a polyamine having primary and/or secondary amino groups; and/or (ii) a reaction product of a polyisocyanate and a polyol; (b) a curing agent comprising a mixture of polyamines, wherein at least one polyamine in the curing agent has an amine equivalent weight of 125 to 250; and (c) an abrasion resistant additive comprising organic and inorganic particles. The organic particles demonstrate a volume average particle size of at least 5 microns, and the inorganic particles demonstrate a volume average particle size of at least 90 microns. The present invention is also directed to a coated substrate comprising a substrate having at least one coatable surface, and a cured coating layer applied to at least one surface of the substrate, formed from the curable composition described above.

The present invention is further directed to a footwear component prepared from the curable composition described above.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges contained therein. Plural encompasses singular and vice versa. "Including" and like terms are open ended; that is, they mean "including but not limited to". For example, while the invention has been described herein including the claims in terms of "a" polyurea, "a" polyurethane, "an" isocyanate, "an" amine, "a" polyol, "a" polythiol, "a" prepolymer, "a" catalyst, and the like, mixtures of all of such things can be used. Also, as used herein, the term "polymer" is meant to refer to prepolymers, oligomers and both homopolymers and copolymers; the prefix "poly" refers to two or more.

Reference to any monomer(s) herein refers generally to a monomer that can be polymerized with another polymerizable compound such as another monomer or polymer. Unless otherwise indicated, it should be appreciated that once the monomer components react with one another to form the compound, the compound will comprise the residues of the monomer components.

The present invention is directed to a curable composition comprising (a) an isocyanate-functional prepolymer. The isocyanate-functional prepolymer comprises (i) a reaction product of a polyisocyanate and a polyamine having primary and/or secondary amino groups; and/or (ii) a reaction product of a polyisocyanate and a polyol. Note that the phrase "and/or" when used in a list is meant to encompass alternative embodiments including each individual component in the list as well as any combination of components. For example, the list "A, B, and/or C" is meant to encompass six separate embodiments that include A, or B, or C, or A+B, or A+C, or B+C, or A+B+C. Also, as used herein, an "isocyanate functional prepolymer" refers to the reaction product of a polyisocyanate with polyamine and optionally other isocyanate reactive groups such as polyol and/or thiol; the isocyanate functional prepolymer has at least one free isocyanate functional group (NCO). Combinations of isocyanate-functional prepolymers can be used according to the present invention. The reaction mixture used to prepare the isocyanate-functional prepolymer is essentially free of any phosphorus-containing polyols. The curable composition is also essentially free of any a phosphorus-containing polyols or reaction products thereof. As used throughout this specification, including the claims, by "essentially free" is meant that a compound is not intentionally present in the composition; and if a compound is present in the composition, it is present incidentally in an amount less than 0.1 percent by weight, usually less than trace amounts.

As used herein, the terms "cure" and "curable" refer to a composition wherein any crosslinkable components of the composition are or may be at least partially crosslinked via chemical reaction. For example, the crosslink density of the crosslinkable components (i.e., the degree of crosslinking) ranges from 5% to 100%, such as at least 5%, or at least 35%, or at least 50%, and at most 100% or at most 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

As used herein, the term "isocyanate" includes unblocked isocyanate compounds capable of forming a covalent bond with a reactive group such as a hydroxyl, thiol or amine functional group. Thus, isocyanate can refer to "free isocyanate". Alternatively, it may be blocked with any known blocking agent.

Suitable polyisocyanates for use in preparing the isocyanate-functional prepolymer can include one or more of those that are known in the art. Non-limiting examples of suitable polyisocyanates can include monomeric, dimeric, trimeric and/or oligomeric polyisocyanates. For example, the isocyanate can be $C_2$-$C_{20}$ linear, branched, cyclic, aromatic, aliphatic, or combinations thereof.

Polyisocyanates used to prepare the isocyanate-functional prepolymer are often aliphatic. Examples of suitable polyisocyanates include isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Examples of aromatic polyisocyanates include phenylene diisocyanate, toluene diisocyanate (TDI), xylene diisocyanate, 1,5-naphthalene diisocyanate, chlorophenylene 2,4-diisocyanate, bistoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate; mixed aralkyl diisocyanates such as tetramethylxylyl diisocyanates, OCN—C(CH$_3$)$_2$—C$_6$H$_4$C(CH$_3$)$_2$—NCO; and mixtures thereof.

The polyisocyanate used to prepare the isocyanate-functional prepolymer can include dimers such as the uretdione of 1,6-hexamethylene diisocyanate, trimers such as the biuret and isocyanurate of 1,6-hexanediisocyanate and the isocyanurate of isophorone diisocyanate, and allophonates. Modified isocyanates can also be used, including carbodiimides and uretone-imines, and mixtures thereof. Suitable materials include, without limitation, those available under the designation DESMODUR from Covestro LLC and include DESMODUR N 3200, DESMODUR N 3300, DESMODUR N 3400, DESMODUR N3900 and DESMODUR XP 2580. TOLONATE HDT LV2, available from Vencorex Chemicals, is also suitable.

It is advantageous to use the polyisocyanate in an excess amount, often greater than 10 percent by weight, based on the total weight of resin solids in the isocyanate-functional prepolymer (a). The excess polyisocyanate serves as a plasticizer in the curable composition.

The polyisocyanate is reacted with (i) a polyamine having primary and/or secondary amino groups and/or (ii) a polyol. The polyamines and polyols may be any of those known in the art, such as acrylic, polyester, polycarbonate, and/or polyether. Polyethers are used most often. Suitable polyethers include polyoxyalkyleneamines having two or more primary and/or secondary amino groups attached to a backbone, derived, for example, from propylene oxide, ethylene oxide, butylene oxide or a mixture thereof. Examples of such amines include those available under the designation JEFFAMINE, such as JEFFAMINE D-230, D-400, D-2000, HK-511, ED-600, ED-900, ED-2003, T-403, T-3000, T-5000, SD-231, SD-401, SD-2001, and ST-404 (from Huntsman Corporation). Such amines have an approximate number average molecular weight ranging from 200 to 7500. As used herein, number or weight average molecular weight of polymers and oligomers is determined by gel permeation chromatography (GPC) using a polystyrene standard.

Suitable polyethers having hydroxyl groups include polyether polyols such as polyalkylene ether polyols, which include those having the following structural formula:

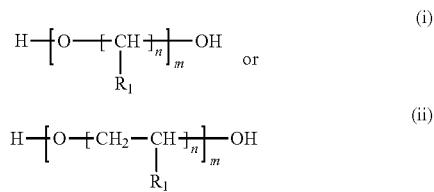

where the substituent R1 is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyether polyols include those sold under the names TERATHANE (e.g., TERATHANE 250, TERATHANE 650, TERATHANE 1000) and TERACOL, available from Invista Corporation, and POLYMEG, available from Lyondell Chemical Co.

In a particularly suitable example of the present invention, the isocyanate-functional prepolymer comprises a reaction product of a polyisocyanate and a polyether having primary amino groups. For example, the isocyanate-functional prepolymer is often a reaction product of isophorone diisocyanate and JEFFAMINE D-4000.

The isocyanate-functional prepolymer typically has a weight average molecular weight of 1400 to 15,000, often 4000 to 15,000, or 5000 to 10,000. In addition, the isocyanate-functional prepolymer usually has an isocyanate equivalent weight greater than 300, often 400 to 1000.

The curable composition of the present invention may further comprise a non-prepolymer isocyanate, such as a monomeric polyisocyanate, in combination with the isocyanate functional prepolymer. The non-prepolymer isocyanate can be the same or different from the polyisocyanate used to form the isocyanate-functional prepolymer, and may comprise one or more of those disclosed above. If combinations of isocyanates are used, the isocyanates should be substantially compatible, for example; the isocyanate-functional prepolymers can be substantially compatible with the non-prepolymer isocyanate. As used herein, "substantially compatible" means the ability of a material to form a blend with other materials that is and will remain substantially homogeneous over time. The reaction of an isocyanate with an organic material, such as in the formation of an isocyanate functional prepolymer, helps to compatibilize the isocyanate.

The curable composition of the present invention further comprises (b) a curing agent that in turn comprises a mixture of polyamines. At least one polyamine in the mixture has an amine equivalent weight of 125 to 250. Such polyamines provide hardness to the curable composition. Suitable polyamines can include those that are known in the art. Non-limiting examples of suitable polyamines can include but are not limited to primary and secondary amines, and mixtures thereof, such as any of those disclosed herein. Amine terminated polyureas may also be used. Amines comprising tertiary amine functionality can be used provided that the amine further comprises at least two primary and/or secondary amino groups.

The mixture of polyamines may include, for example, polyamines having at least two functional groups such as di-, tri-, or higher functional amines; and combinations thereof. The polyamines may be aromatic or aliphatic such as cycloaliphatic, or mixtures thereof. Suitable primary polyamines include ethylene diamine, 1,2-diaminopropane, 1,4-diaminobutane, 1,3-diaminopentane (DYTEK EP, Invista), 1,6-diaminohexane, 2-methyl-1,5-pentane diamine (DYTEK A, Invista), 2,5-diamino-2,5-dimethylhexane, 2,2, 4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane (isophorone diamine or IPDA), 2,4- and/or 2,6-hexahydrotoluylene diamine, 2,4'-diaminodicyclohexyl methane, 4,4'-diaminodicyclohexyl methane (PACM-20, Air Products) and 3,3'-dialkyl-4,4'-diaminodicyclohexyl methanes (such as 3,3'-dimethyl-4,4'-diaminodicyclohexyl methane (DIMETHYL DICYKAN or LAROMIN C260, BASF; ANCAMINE 2049, Air Products) and 3,3'-diethyl-4,4'-diaminodicyclohexyl methane), 2,4- and/or 2,6-diaminotoluene, 3,5-diethyltoluene-2,4-diamine, 3,5-diethyltoluene-2,6-diamine, 3,5-dimethylthio-2,4-toluenediamine, 3,5-dimethylthio-2,4-toluenediamine, 2,4'- and/or 4,4'-diaminodiphenyl methane, dipropylene triamine, bis hexamethylene triamine, or combinations thereof.

Secondary cycloaliphatic diamines may also be used in the present invention. Suitable cycloaliphatic diamines include JEFFLINK 754 (Huntsman Corporation), CLEARLINK 1000 (Dorf-Ketal Chemicals, LLC), and aspartic ester functional amines, such as those available under the name DESMOPHEN such as DESMOPHEN NH1220, DESMOPHEN NH 1420, and DESMOPHEN NH 1520 (Covestro LLC.). Other suitable secondary amines that can be used in the present invention include the reaction products of materials comprising primary amine functionality, such as those described herein, with acrylonitrile. For example, the secondary amine can be the reaction product of 4,4'-diaminodicyclohexylmethane and acrylonitrile. Alternatively, the secondary amine can be the reaction product of isophorone diamine and acrylonitrile, such as POLYCLEAR 136 (available from BASF/Hansen Group LLC). The aliphatic secondary diamine often has an amine equivalent weight of up to 200, more often up to 162.

Other polyamines that can be used in the curing agent (b) in the present invention include adducts of primary polyamines with mono or polyepoxides such as the reaction product of isophorone diamine with CARDURA E-10P, available from Hexion, Inc.

Often the curing agent (b) comprises 5 to 50 percent by weight of an aliphatic polyamine having an amine equivalent weight of 125 to 250, and 50 to 95 percent by weight of an aliphatic polyamine having an amine equivalent weight of 900 to 2500. For example, the curing agent often comprises 20 percent by weight CLEARLINK 1000, with an amine equivalent weight of about 161, and 80 percent by weight JEFFAMINE T-5000, a trifunctional aliphatic amine that has an amine equivalent weight of about 1902.

The curing agent (b) may further comprise additional resins having hydroxyl functional groups. Examples include polyester polyols and polyether polyols, such as the polyether polyols disclosed above. TERATHANE 650 is often used as an additional resin in the curing agent. Such resins, when used, may be present in an amount of 2 to 15 percent by weight, based on the total weight of solids in the curing agent.

The curable composition of the present invention further comprises (c) an abrasion resistant additive. The abrasion resistant additive comprises a mixture of organic and inorganic particles. Often the particles are chemically inert, untreated and uncoated particles. By "chemically inert" is meant that the particles do not chemically react with any other component in the curable composition. When the particles are organic they demonstrate a volume average particle size of at least 5 microns, such as 5 to 7.5 microns or 9.75 to 60 microns; and when the particles are inorganic they demonstrate a volume average particle size of at least 90 microns, often at least 95 microns. Particle sizes within these size ranges are measured using a HELOS particle size analyzer, available from Sympatec GmbH, via laser diffraction in accordance with ISO 13320:2009 and using Fraunhofer Enhanced Evaluation, unless otherwise indicated.

Suitable organic particles include polyethylene, polypropylene, and saturated, linear primary alcohols with an average carbon chain length of C20 to C50. Such saturated, linear primary alcohols include UNILIN alcohols available from Baker Hughes, Inc. Particulate copolymers of polyethylene and polypropylene with a volume average particle size of 5.0 to 7.5 microns, available from Baker Hughes, Inc. as PETROLITE, such as PETROLITE 5000 T6, may also be used.

Suitable inorganic particles include, inter alia, untreated alumina, such as those available in the MICROGRIT line of products from Micro Abrasives Corporation. Combinations of each type of particle are also possible.

Depending on the intended application, the weight ratio of organic particles to inorganic particles in the abrasion resistant additive may range from 1:99 to 99:1, such as 10:90 to 90:10, 50:50, or less than 10:40. The abrasion resistant additive is typically present in the curable composition of the present invention in an amount of at least 10 percent by weight, often at least 20 percent by weight, based on the total weight of solids in the curable composition.

The curable composition of the present invention may comprise one or more additional ingredients. Additional ingredients may include, for example, an adhesion promoter such as amine functional materials, aminosilanes and the like, halogenated polyolefin (e. g., chlorinated polyolefin) or organic titanate. A tertiary amine comprising 1,5-diazabicyclo[4.3.0]non-5-ene, 1,8-diazabicyclo[5.4.0]undec-7-ene, and/or 1,4-diazabicyclo[2.2.2]octane is an exemplary amine functional material suitable as an adhesion promoter. An example of an aminosilane for use as an adhesion promoter is y-aminopropyltriethoxysilane (commercially available as SILQUEST A1100 from Momentive Performance Chemicals). SILQUEST A1110 and A LINK 35 from Momentive Performance Chemicals may also be used. Other suitable amine-functional adhesion promoters include 1,3,4,6,7,8-hexahydro-2H-pyrimido-(1,2-A)-pyrimidine, hydroxyethyl piperazine, N-aminoethyl piperazine, dimethylamine ethylether, tetramethyliminopropoylamine (commercially available as POLYCAT® 15 from Air Products and Chemicals, Inc., blocked amines such as an adduct of IPDI and dimethylamine, a melamine such as melamine itself or an imino melamine resin (e.g. CYMEL® 220 or CYMEL® 303, available from Allnex). Metal-containing adhesion promoters may include metal chelate complexes such as an aluminum chelate complex (e.g. K-Kat 5218 available from King Industries) or tin-containing compositions such as stannous octoate and organotin compounds such as dibutyltin dilaurate and dibutyltin diacetate. Other adhesion promoters may include salts such as chlorine phosphate, butadiene resins such as an epoxidized, hydroxyl terminated polybutadiene resin (e.g. POLY Bd® 605E available from Atofina Chemicals, Inc.), polyester polyols (e.g. CAPA® 3091, a polyester triol available from Solvay America, Inc., and urethane acrylate compositions such as an aromatic urethane acrylate oligomer (e.g. CN999 available from Sartomer Company, Inc.). Suitable organic titanate adhesion promoters include tetra n-butyl titanate, tetra isopropyl titanate, butyl isopropyl titanate, and titanium acetyl acetonate.

The curable compositions according the present invention can further comprise any additional resins and/or additives that will impart to the composition a desired property. For example, the composition may further comprise a resin and/or additive that imparts additional flexibility to a coating formed from the composition. Flexible polyurethane resins are known in the art, and are also described, for example, in U.S. patent application Ser. Nos. 11/155,154; 11/021,325; 11/020,921; 12/056,306 and 12/056,304, incorporated in pertinent part herein by reference. The polyurethane itself can be added to the composition, or the polyurethane can be formed in situ in the curable composition. It will be appreciated that polyurethane can be formed by reacting a hydroxyl functional component with an isocyanate, much in the same manner as the amine and isocyanate components described herein react. Thus, a hydroxyl functional component can be mixed with, or used in addition to, the amine component for in situ polyurethane formation.

The curable compositions of the present invention may optionally include materials standard in the art such as fiberglass, stabilizers, thickeners, catalysts, colorants, antioxidants, UV absorbers, hindered amine light stabilizers, rheology modifiers, flow additives, anti-static agents and other performance or property modifiers that are well known in the art of surface coatings, and mixtures thereof. Suitable rheology modifiers include solid and/or liquid rheology modifiers, which can be organic and/or inorganic based polymers, such as bentonite clay, fumed silica, BYK 411 (available from Chemie), or combinations thereof.

The curable composition of the present invention may include a colorant. As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used in the compositions of the present invention. It is noted that particulate colorants are different from the particles present in the abrasion resistant additive (c). It has been found that particulate colorants do not impart sufficient abrasion resistance to the curable compositions to be considered suitable, as shown in the examples below.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the compositions by grinding or simple mixing. Colorants can be incorporated by grinding into the composition by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, and U.S. Provisional Application No. 60/482,167 filed Jun. 24, 2003.

Example special effect compositions that may be used in the composition of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. Special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the composition of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. The photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. The photosensitive composition and/or photochromic composition associated with and/or at least partially bound to a polymer and/or polymerizable component have minimal migration out of the composition.

In general, the colorant can be present in the curable composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The curable compositions of the present invention, when applied to a substrate for example as a coating, may possess color that matches the color of an associated substrate. As used herein, the term "matches" and like terms when referring to color matching means that the color of the coating composition of the present invention substantially corresponds to a desired color or the color of an associated substrate. This can be visually observed, or confirmed using spectroscopy equipment. For instance, when the substrate for the curable composition is a footwear component, such as a polymeric bladder or upper component, the color of the curable composition may substantially match that of another footwear component. For example, a toe coated with a curable composition of the present invention can be color matched to the rest of the shoe upper, the midsole and/or the outsole. This match can be visually observed, or confirmed using spectroscopy equipment.

The curable compositions of the present composition are typically prepared as multi-package systems to prevent the components from curing prior to use. The term "multi-package systems" means compositions in which various components are maintained separately until just prior to use, such as application to a substrate as a coating. The compositions of the present invention are usually prepared as a two-package ("2K") composition, wherein the isocyanate-functional prepolymer (a) is a first package and the curing agent (b) is the second package. The curable compositions of the present invention are suitable for use as coatings, or they may be molded, cast, 3-D printed, or otherwise shaped into an article of manufacture.

The composition can be cured at ambient conditions, although heated air or a heat cure can be applied to the composition in order to accelerate curing of the composition or to enhance properties such as adhesion. By "ambient" conditions is meant without the application of heat or other energy; for example, when a curable composition undergoes a thermosetting reaction without baking in an oven, use of forced air, irradiation, or the like to prompt the reaction, the reaction is said to occur under ambient conditions. Usually ambient temperature ranges from 60 to 90° F. (15.6 to 32.2° C.), such as a typical room temperature, 72° F. (22.2° C.). Alternatively, the composition may be exposed to actinic radiation or to an elevated temperature for a time sufficient to at least partially cure the curable film-forming composition. Typical actinic radiation conditions are 315 to 400 nm (UVA) at an irradiation intensity of 1.5 to 2.0 mW/cm$^2$. The composition can be cured at ambient temperature typically in a period ranging from about 45 seconds to about 12 hours. For example, the composition can be cured at 72° F. (22.2° C.) in a period ranging from about 45 seconds to about 12 hours. If ambient temperature and baking are utilized in combination to achieve other desired properties such as better adhesion, the composition is typically allowed to stand for a period of from about 45 seconds to about 30 minutes followed by conditioning (curing) at a temperature up to about 140° F. (60° C.), for a period of time ranging from about 20 minutes to about 12 hours.

The present invention is further drawn to a coated substrate comprising A) a substrate having at least one coatable surface; and B) a coating layer formed from a film-forming composition applied to at least one surface of the substrate and cured thereon. The film-forming composition is prepared from the curable composition described above.

Non-limiting examples of suitable substrates can include metal, natural and/or synthetic stone, ceramic, glass, brick, cement, concrete, cinderblock, wood and composites and laminates thereof; wallboard, drywall, sheetrock, cement board, plastic, paper, PVC, roofing materials such as shingles, roofing composites and laminates, and roofing drywall, styrofoam, plastic composites, acrylic composites, ballistic composites, asphalt, fiberglass, soil, gravel and the like. Metals can include but are not limited to aluminum, cold rolled steel, electrogalvanized steel, hot dipped galvanized steel, titanium and alloys; polymeric materials can include but are not limited to TPO, SMC, TPU, polypropylene, polycarbonate, polyethylene, and polyamides (Nylon). The substrates can be primed metal and/or plastic; that is, an organic or inorganic layer is applied thereto. Materials that are commonly used in footwear including fabrics, leather, and foams, such as ethylene vinyl acetate (EVA) foam or polyurethane (such as TPU) foam are also suitable substrates.

The curable composition of the present invention may be applied to a bare (e.g., untreated, uncoated) substrate, a pretreated substrate and/or coated substrate having at least one other coating. For example, the surface of the substrate may be plasma-treated prior to application of the curable composition, to enhance adhesion between the substrate surface and the coating layer. Alternatively, an adhesive layer comprising an adhesion promoter may be disposed between the substrate and the coating layer. In another example, the curable composition of the present invention may be applied to a multi-layer coating composite. The first coating applied to a substrate may be selected from a variety of coating compositions known in the art for surface coating substrates. Non-limiting examples may include electrodepositable film-forming compositions, primer compositions, pigmented or non-pigmented monocoat compositions, pigmented or non-pigmented base coat compositions, transparent topcoat compositions, industrial coating compositions, and the like.

The compositions may be applied to the substrate by one or more of a number of methods including spraying, dipping/immersion, brushing, or flow coating. When the substrate comprises flooring, they are most often applied by spraying. Conventional spray techniques and equipment for air spraying and electrostatic spraying and either manual or automatic methods can be used as described below. The coating layer typically has a dry film thickness of 1-25 mils (25.4-635 microns), often 5-80 mils (127-2032 microns). Curing conditions may be as described above.

When the curable composition is spray applied to a substrate, the composition may be prepared using a two-component mixing device. In this example, isocyanate and amine are added to a high pressure impingement mixing device. The isocyanate is added to the "A-side" and amine is added to the "B-side". The A- and B-side streams are impinged upon each other and immediately sprayed onto at least a portion of an uncoated or coated substrate. The isocyanate and the amine react to produce a coating composition that is cured upon application to the uncoated or coated substrate. The A- and/or B-side can also be heated prior to application, such as to a temperature of ≤70° C., such as 60° C. Heating may promote a better viscosity match between the two components and thus better mixing, but is not necessary for the curing reaction to occur. The A- and/or B-side may be applied at a temperature ≤23° C., such as from 7° C. to 14° C.

A "static mix tube" applicator, which is an application device known in the art, may be used with the present invention. In this device, the isocyanate and amine are each stored in a separate chamber. As pressure is applied, each of the components is brought into a mixing tube in a 1:1 ratio by volume. Mixing of the components is effected by way of a torturous or cork screw pathway within the tube. The exit end of the tube may have atomization capability useful in spray application of the reaction mixture. Alternatively, the fluid reaction mixture may be applied to a substrate as a bead. A static mix tube applicator is commercially available from Plas-Pak Industries Inc. or Cammda Corporation.

The volume mixing ratio of the isocyanate and amine may be such that the resulting isocyanate and amine reaction mixture can be applied to a substrate at a volume mixing ratio of 1:1. As used herein, "volume mixing ratio 1:1" means that the volume mixing ratio varies by up to 20% for each component, or up to 10% or up to 5%.

It is believed that the ratio of equivalents of isocyanate groups to amine groups may be selected to control the rate of cure of the coating composition of the present invention. It has been found that cure and adhesion advantages may result when the ratio of the equivalents of isocyanate groups to amine groups (also known as the reaction index) is greater than one, such as from 1.01 to 1.10:1, or from 1.03 to 1.10:1, or from 1.05 to 1.08:1 or from 1.01 to 1.4 to 1 or from 1.01 to 1.5, or 1.3 or greater to 1. The term "1:1 volume ratio" means that the volume ratio varies by up to 20% for each component, or up to 10% or up to 5%.

A commercially available mixing device can be used such as those described in Paragraphs [0037] and [0038] of United States Patent Publication Number 2007/0160851.

Upon application of the curable composition to a substrate as a coating and after curing to form a coated substrate, the coated substrate demonstrates a coating loss of less than 0.33 $cm^3$ after being subjected to 1000 cycles of a TABER Abrasion Test using S-42 sandpaper strips and two 1000 gram weights, from Taber Industries. The TABER Abrasion Test is conducted as described in the Examples below.

The present invention is further directed to a footwear component prepared from any of the curable compositions described above. The curable composition may be used as a coating on a component, or may be used to form the entire component itself. As used herein, the terms "footwear" and "shoe" include athletic and sport shoes, men's and women's dress shoes, men's and women's casual shoes, children's shoes, sandals, flip flops, boots, work boots, outdoor footwear, orthopedic shoes, slippers and the like. The term "footwear component" includes any component of a shoe including the outsole, midsole, polymeric bladder, upper materials and shoe liners. It will be appreciated that these components are made from a number of different materials or substrates. In certain examples, the footwear component coated according to the present invention forms all or part of a shoe upper. A particularly suitable portion of the upper coated according to the present invention is the toe. The "toe" will be understood as referring to the front portion of the shoe, which typically experiences a relatively high level of wear and/or abrasion. It has been surprisingly discovered that coating this portion of the shoe with a curable composition of the present invention results in improved resistance to wear and/or abrasion.

The footwear component may also comprise a polymeric bladder coated with a curable composition of the present invention. The polymeric bladder can be filled, for example, with plasma, water, or other fluid, such as gases, including air, nitrogen and the like. Such bladders are known in the footwear industry, and are described, for example, in U.S. Pat. Nos. 6,944,973; 6,119,371; 5,713,141; 5,952,065; 5,353,459; 4,506,460; and U.S. Pat. No. 4,219,945.

In certain examples of the present invention, the polymeric bladder is contained within a midsole, and it is the midsole that is coated at least in part with a curable composition of the present invention. For example, the composition can be applied to the underside of a midsole containing a nitrogen-filled polymeric bladder to protect the bladder against puncture failure. In other examples, the polymeric bladder is contained within the outsole.

The footwear component may also be an outsole comprising the curable composition of the present invention. The outsole may be formed by casting a sheet of the curable composition and post-processing the sheet to a desired shape and form, casting the curable composition in a mold, spraying the curable composition into a mold, 3-D printing, or injection-molding the component. The outsole may be preformed and then subsequently adhesively attached to the midsole. Adhesion between the midsole and the curable composition may be enhanced by including an adhesion promoter in the curable composition, treating the surface of the midsole (such as by plasma treating) prior to applying the curable composition thereto, and/or applying an adhesive layer to the surface of the midsole prior to applying the curable composition thereto. It may be desirable to wipe the midsole with a solvent prior to application of the preformed outsole (or prior to application of the curable composition if the outsole is being formed in situ); suitable solvents include those that will be innocuous to the substrate being coated, such as acetone, MEK, isopropanol and the like. When the midsole comprises foam, it may be desirable to dip the component in powder prior to application of the outsole, such as is described in U.S. patent application Ser. No. 11/448,627.

Dry film thicknesses of the footwear components may range from 20 to 1000 mils (508 to 25400 microns), or from 40 to 150 mils (1016 to 3810 microns), or from 60 to 100 mils (1524-2540 microns), or from 500 to 750 mils (12700 to 19050 microns). It will be appreciated that these layers are relatively "thick". The compositions of the present invention can also be applied as much thinner layers as well, such as 0.1 to less than 15 mils (2.54 to less than 381 microns), or 0.1 to 10 (2.54 to 254 microns), or 0.5 to 3 (12.7 to 76.2 microns), or 1 to 2 mils (25.4 to 50.8 microns). Any of the endpoints within these ranges can also be combined. Because the inorganic particles are so much larger than the organic particles that are used in the abrasion resistant additive in the curable compositions of the present invention, the dry film thickness of the outsole varies depending on the relative amounts of each type of particle. For example, when the weight ratio of organic particles to inorganic particles is less than 10:40, the dry film thickness of the outsole is typically 508 to 25400 microns. When the weight ratio of organic particles to inorganic particles is at least 40:10, the dry film thickness of the outsole is typically 25.4 to 254 microns.

A footwear component, such as an outsole, prepared as described herein, will typically provide good traction to the user, particularly in wet conditions such as rain or snow. The component will also typically exhibit enhanced wear and/or abrasion resistance as compared with a typical natural and/or synthetic rubber outsole.

The wear resistance observed in footwear components according to the present invention is particularly relevant in the tread and other portions of the shoe outsole, but is also particularly relevant in the toe of the shoes, especially shoes used for tennis, where the toe is often dragged during play such as during service. It is often the case that the wearer can abrade the toe such that the aesthetics or even the shoe itself are impaired and ultimately such that a hole can be worn through the toe. The footwear components of the present invention typically demonstrate a material loss of less than 0.33 $cm^3$ after being subjected to 1000 cycles of a TABER Abrasion Test using S-42 sandpaper strips and two 1000 gram weights.

Each of the characteristics and examples described above, and combinations thereof, may be said to be encompassed by the present invention. The present invention is thus drawn to the following nonlimiting aspects:

1. A curable composition comprising:
   (a) an isocyanate-functional prepolymer having a weight average molecular weight of 4000 to 15,000, wherein the isocyanate-functional prepolymer comprises (i) a reaction product of a polyisocyanate and a polyamine having primary and/or secondary amino groups; and/or (ii) a reaction product of a polyisocyanate and a polyol;
   (b) a curing agent comprising a mixture of polyamines, wherein at least one polyamine in the curing agent has an amine equivalent weight of 125 to 250; and
   (c) an abrasion resistant additive comprising organic and inorganic particles, wherein the organic particles demonstrate a volume average particle size of at least 5 microns, and the inorganic particles demonstrate a volume average particle size of at least 90 microns.

2. The curable composition according to aspect 1 wherein the polyisocyanate used to prepare the isocyanate-functional prepolymer is aliphatic.

3. The curable composition according to any of aspects 1 to 2 wherein isocyanate-functional prepolymer has an isocyanate equivalent weight greater than 300.

4. The composition according to any of aspects 1 to 3, wherein the isocyanate-functional prepolymer comprises a reaction product of a polyisocyanate and a polyether having primary amino groups.

5. The composition according to any of aspects 1 to 4, wherein the curing agent comprises 5 to 50 percent by weight of an aliphatic polyamine having an amine equivalent weight of 125 to 250, and 50 to 95 percent by weight of an aliphatic polyamine having an amine equivalent weight of 900 to 2500.

6. The composition according to any of aspects 1 to 5, wherein the organic and inorganic particles of the abrasion resistant additive comprise chemically inert, untreated and uncoated particles.

7. The composition according to any of aspects 1 to 6, wherein the abrasion resistant additive is present in the composition in an amount of at least 10 percent by weight, based on the total weight of solids in the composition.

8. The composition according to any of aspects 1 to 7, wherein the inorganic particles comprise untreated alumina, and the organic particles comprise polyethylene, polypropylene, and/or saturated, linear primary alcohols with an average carbon chain length of $C_{20}$ to $C_{50}$.

9. The composition according to any of aspects 1 to 8, wherein the organic particles of the abrasion resistant additive demonstrate a volume average particle size of 5 to 7.5 microns.

10. A coated substrate comprising:
    A) a substrate having at least one coatable surface, and
    B) a coating layer formed from a film-forming composition applied to at least one surface of the substrate and cured thereon, wherein the film-forming composition is prepared from the curable composition according to any of aspects 1 to 9.

11. The coated substrate according to aspect 10, wherein the substrate comprises wood, metal, glass, fabric, leather, a composite, or a polymeric material.

12. The coated substrate according to any of aspects 10 to 11, wherein the substrate comprises a plasma-treated surface adjacent to the coating layer formed from the curable composition.

13. The coated substrate according to any of aspects 10 to 12, further comprising an adhesive layer disposed between the substrate (A) and the coating layer (B), wherein the adhesive layer comprises an adhesion promoter.

14. A footwear component wherein the component is prepared from a curable composition according to any of aspects 1 to 9, wherein the footwear component demonstrates a coating loss of less than 0.33 cm$^3$ after being subjected to 1000 cycles of a TABER Abrasion Test using S-42 sandpaper strips and two 1000 gram weights.

15. The footwear component according to aspect 14 wherein said footwear component demonstrates a dry film thickness of 508 to 25400 microns and the weight ratio of organic to inorganic particles in the abrasion resistant additive is less than 10:40.

16. The footwear component according to aspect 14 wherein said footwear component demonstrates a dry film thickness of 25.4 to 254 microns and the weight ratio of organic to inorganic particles in the abrasion resistant additive is at least 40:10.

17. The footwear component according to any of aspects 14 to 16 wherein the curable composition further comprises an adhesion promoter.

18. Footwear comprising the footwear component according to any of aspects 14 to 17.

Whereas specific examples of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example A

An isocyanate-functional prepolymer was prepared from the following ingredients as described below:

| Ingredients | Weight (grams) |
| --- | --- |
| ISOPHORONE DIISOCYANATE[1] | 1000.0 |
| JEFFAMINE D2000[2] | 2217.0 |
| DIBUTYLTIN DILAURATE | 0.65 |

[1]Available from Covestro LLC
[2]Available from Huntsman

A total of 1000 grams of isophorone diisocyanate was placed in a suitable reaction vessel equipped with a stirrer, temperature probe, a condenser and a nitrogen inlet tube and blanketed with nitrogen gas. The contents of the flask were heated to 40° C. and then 2217 grams of JEFFAMINE D2000 and was added over 70 minutes, during which time the temperature increased to about 56° C. After the feed was complete, 0.65 grams of dibutyltin dilaurate was added and the mixture was heated to 70° C. The mixture was held at 70° C. for 2.5 h, during which time the isocyanate equivalent weight reached about 500 grams per equivalent. The final material had a measured isocyanate equivalent weight of 505.8 as measured by ASTM D2572 "Standard Test Method for Isocyanate Groups in Urethane Materials or Prepolymers" and a weight average Molecular Weight (Mw) of ~5300 as measured by Gel Permeation Chromatography versus a polystyrene standard.

Example B

An isocyanate-functional prepolymer was prepared from the following ingredients as described below:

| Ingredients | Weight (grams) |
| --- | --- |
| ISOPHORONE DIISOCYANATE[1] | 450.0 |
| JEFFAMINE D2000[2] | 1668.0 |
| DIBUTYLTIN DILAURATE | 0.43 |

[1]Available from Covestro LLC
[2]Available from Huntsman

A total of 450 grams of isophorone diisocyanate was placed in a suitable reaction vessel equipped with a stirrer, temperature probe, a condenser and a nitrogen inlet tube and blanketed with nitrogen gas. At room temperature (23° C.) 1668 grams of JEFFAMINE D2000 and was added over 25 minutes, during which time the temperature increased to about 62° C. After the feed was complete, 0.43 grams of dibutyltin dilaurate was added and the mixture held for 30 minutes after which the mixture was heated to 70° C. The mixture was held at 70° C. for 1 hour, during which time the isocyanate equivalent weight reached about 1000 grams per equivalent. The final material had a measured isocyanate equivalent weight of 1025 as measured by ASTM D2572 "Standard Test Method for Isocyanate Groups in Urethane Materials or Prepolymers" and a weight average Molecular Weight (Mw) of ~6800 as measured by Gel Permeation Chromatography versus a polystyrene standard.

Example C

An isocyanate-functional prepolymer was prepared from the following ingredients as described below:

| Ingredients | Weight (grams) |
| --- | --- |
| ISOPHORONE DIISOCYANATE[1] | 850.0 |
| JEFFAMINE D2000[2] | 2346.0 |
| DIBUTYLTIN DILAURATE | 0.64 |

[1]Available from Covestro LLC
[2]Available from Huntsman

A total of 850 grams of isophorone diisocyanate was placed in a suitable reaction vessel equipped with a stirrer, temperature probe, a condenser and a nitrogen inlet tube and blanketed with nitrogen gas. At room temperature (22° C.) 2346 grams of JEFFAMINE D2000 and was added over 70 minutes, during which time the temperature increased to about 57° C. After the feed was complete, 0.64 grams of dibutyltin dilaurate was added and the mixture held for 15 minutes after which the mixture was heated to 70° C. The mixture was held at this temperature for 1.25 hour, during which time the isocyanate equivalent weight reached about 650 grams per equivalent. The final material had a measured isocyanate equivalent weight of 653 as measured by ASTM D2572 "Standard Test Method for Isocyanate Groups in Urethane Materials or Prepolymers" and a weight average Molecular Weight (Mw) of ~5300 as measured by Gel Permeation Chromatography versus a polystyrene standard.

Example D

An isocyanate-functional prepolymer was prepared from the following ingredients as described below:

| Ingredients | Weight (grams) |
|---|---|
| ISOPHORONE DIISOCYANATE[1] | 760.0 |
| JEFFAMINE D2000[2] | 1356.4 |
| DIBUTYLTIN DILAURATE | 0.42 |

[1]Available from Covestro LLC
[2]Available from Huntsman

A total of 760 grams of isophorone diisocyanate was placed in a suitable reaction vessel equipped with a stirrer, temperature probe, a condenser and a nitrogen inlet tube and blanketed with nitrogen gas. At room temperature (22° C.) 1356 grams of JEFFAMINE D2000 and was added over 70 minutes, during which time the temperature increased to about 56° C. After the feed was complete, 0.42 grams of dibutyltin dilaurate was added and the mixture held for 15 minutes after which the mixture was heated to 70° C. The mixture was held at this temperature for 2 hours, during which time the isocyanate equivalent weight reached about 404 grams per equivalent. The final material had a measured isocyanate equivalent weight of 403 as measured by ASTM D2572 "Standard Test Method for Isocyanate Groups in Urethane Materials or Prepolymers" and a weight average Molecular Weight (Mw) of ~4600 as measured by Gel Permeation Chromatography versus a polystyrene standard.

Example E

An isocyanate-functional prepolymer was prepared from the following ingredients as described below:

| Ingredients | Weight (grams) |
|---|---|
| ISOPHORONE DIISOCYANATE[1] | 575.0 |
| JEFFAMINE D2000[2] | 1935.2 |
| DIBUTYLTIN DILAURATE | 0.51 |
| DESMODUR XP2580[3] | 215.7 |
| Tolonate HDT LV2[4] | 182.7 |

[1]Available from Covestro LLC
[2]Available from Huntsman
[3]Polyisocyanate available from Covestro LLC
[4]Polyisocyanate available from Vencorex Chemicals A total of 575 grams of isophorone diisocyanate was placed in a suitable reaction vessel equipped with a stirrer, temperature probe, a condenser and a nitrogen inlet tube and blanketed with nitrogen gas. At room temperature (22° C.) 1935.2 grams of JEFFAMINE D2000 and was added over 60 minutes, during which time the temperature increased to about 57° C. After the feed was complete, 0.51 grams of dibutyltin dilaurate was added and the mixture held for 15 minutes after which the mixture was heated to 70° C. The mixture was held at this temperature for 1.5 hours, during which time the isocyanate equivalent weight reached about 865 grams per equivalent. Next 215.7 g of Desmodur XP2580 and 182.7 g of Tolonate HDT LV2 were added and the material was mixed. After 1 hour, the final material had a measured isocyanate equivalent weight of 599 as measured by ASTM D2572 "Standard Test Method for Isocyanate Groups in Urethane Materials or Prepolymers" and the polymer had a weight average Molecular Weight (Mw) of ~5400 as measured by Gel Permeation Chromatography versus a polystyrene standard.

Example F

An isocyanate-functional prepolymer was prepared from the following ingredients as described below:

| Ingredients | Weight (grams) |
|---|---|
| ISOPHORONE DIISOCYANATE[1] | 355.0 |
| ARCOL POLYOL PPG 725[2] | 598.4 |
| DIBUTYLTIN DILAURATE | 0.062 |
| DESMODUR XP2580[3] | 353.0 |
| Tolonate HDT LV2[4] | 1059.3 |
| Methyl Amyl Ketone | 780.7 |

[1]Available from Covestro LLC
[2]Available from Covestro LLC
[3]Polyisocyanate available from Covestro LLC
[4]Polyisocyanate available from Vencorex Chemicals A total of 355 grams of isophorone diisocyanate was placed in a suitable reaction vessel equipped with a stirrer, temperature probe, a condenser and a nitrogen inlet tube and blanketed with nitrogen gas. At room temperature (21° C.) 598.4 grams of Arcol Polyol PPG 725 was added over 30 minutes with no temperature increase observed. After the feed was complete, 0.062 grams of dibutyltin dilaurate was added and the mixture held for 10 minutes after which the mixture was slowly heated to 80° C. The temperature increased to 100° C. and the mixture was held at this temperature for 2 hours, during which time the isocyanate equivalent weight reached about 585 grams per equivalent. The temperature was reduced to 80° C. and 353.0 g of Desmodur XP2580 and 1059.3 g of Tolonate HDT LV2 were added and the temperature further reduced to 60° C. After 1 hour, the material had a measured isocyanate equivalent weight of about 259 grams per equivalent. Next, 780.7 grams of methyl amyl ketone was added and the final mixture has an isocyanate equivalent weight of about 341 grams per equivalent as measured by ASTM D2572 "Standard Test Method for Isocyanate Groups in Urethane Materials or Prepolymers" and the polymer had a weight average Molecular Weight (Mw) of ~1400 as measured by Gel Permeation Chromatography versus a polystyrene standard.

Formulation Examples

Examples 1 and 5 are control examples with identical compositions (different batches), and contain no abrasive component like that used in the compositions of the present invention. Examples 2-4, 6 and 7 are comparative; they contain either organic or inorganic particles like those used in the abrasive component in the compositions of the present invention. Examples 8 to 20 demonstrate compositions prepared in accordance with the present invention. Curable compositions were prepared from the following ingredients:

| Ingredients | Example 1 Control Weight (grams) | Example 2 Comparative Weight (grams) | Example 3 Comparative Weight (grams) | Example 4 Comparative Weight (grams) |
|---|---|---|---|---|
| "A" SIDE | | | | |
| Isocyanate functional prepolymer of Example D[1] | 100.00 | 100.00 | 100.00 | 100.00 |
| Subtotal Weight | 100.00 | 100.00 | 100.00 | 100.00 |
| "B" SIDE | | | | |
| Jeffamine T5000[4] | 64.50 | 52.00 | 52.00 | 52.00 |
| Clearlink 1000[5] | 27.00 | 23.50 | 23.50 | 23.50 |
| Aerosil 200[7] | 2.00 | | | |
| TiO$_2$[8] | 4.00 | 4.00 | 4.00 | 4.00 |
| Bentone 34[9] | 2.00 | | | |
| Microgrit[10] WCA 3 | | 20.00 | | |
| Microgrit[10] WA 360TO | | | 20.00 | |
| Microgrit[10] WA 180TO | | | | 20.00 |
| DBTDL | 0.50 | 0.50 | 0.50 | 0.50 |
| Subtotal Weight | 100.00 | 100.00 | 100.00 | 100.00 |
| TOTAL WEIGHT | 200.00 | 200.00 | 200.00 | 200.00 |

| Ingredients | Example 5 control Weight (grams) | Example 6 Comparative Weight (grams) | Example 7 Comparative Weight (grams) | Example 8 Weight (grams) |
|---|---|---|---|---|
| "A" SIDE | | | | |
| Isocyanate functional prepolymer of Example D[1] | 100.00 | 100.00 | 100.00 | 100.00 |
| Subtotal Weight | 100.00 | 100.00 | 100.00 | 100.00 |
| "B" SIDE | | | | |
| Jeffamine T5000[4] | 64.50 | 56.00 | 53.50 | 58.50 |
| Clearlink 1000[5] | 27.00 | 34.50 | 32.00 | 26.00 |
| Aerosil 200[7] | 2.00 | | | |
| TiO$_2$[8] | 4.00 | 4.00 | 4.00 | 4.00 |
| Bentone 34[9] | 2.00 | | | |
| Microgrit[10] WA 180TO | 0.00 | 0.00 | 0.00 | 10.00 |
| PETROLITE ™ 5000 T6[11] | 0.00 | 5.00 | 10.00 | 1.00 |
| DBTDL | 0.50 | 0.50 | 0.50 | 0.50 |
| Subtotal Weight | 100.00 | 100.00 | 100.00 | 100.00 |
| TOTAL WEIGHT | 200.00 | 200.00 | 200.00 | 200.00 |

| Ingredients | Example 9 Weight (grams) | Example 10 Weight (grams) | Example 11 Weight (grams) | Example 12 Weight (grams) |
|---|---|---|---|---|
| "A" SIDE | | | | |
| Isocyanate functional prepolymer of Example D[1] | 100.00 | 100.00 | 100.00 | 100.00 |
| Subtotal Weight | 100.00 | 100.00 | 100.00 | 100.00 |
| "B" SIDE | | | | |
| Jeffamine T5000[4] | 54.30 | 48.70 | 50.50 | 46.00 |
| Clearlink 1000[5] | 26.20 | 26.80 | 24.00 | 24.50 |
| TiO$_2$[8] | 4.00 | 4.00 | 4.00 | 4.00 |
| Microgrit[10] WA 180TO | 10.00 | 10.00 | 20.00 | 20.00 |
| PETROLITE ™ 5000 T6[11] | 5.00 | 10.00 | 1.00 | 5.00 |
| DBTDL | 0.50 | 0.50 | 0.50 | 0.50 |
| Subtotal Weight | 100.00 | 100.00 | 100.00 | 100.00 |
| TOTAL WEIGHT | 200.00 | 200.00 | 200.00 | 200.00 |

-continued

| Ingredients | Example 13 Weight (grams) | Example 14 Weight (grams) | Example 15 Weight (grams) | Example 16 Weight (grams) |
|---|---|---|---|---|
| "A" SIDE | | | | |
| Isocyanate functional prepolymer of Example D[1] | 100.00 | 100.00 | 100.00 | 100.00 |
| Subtotal Weight | 100.00 | 100.00 | 100.00 | 100.00 |
| "B" SIDE | | | | |
| Jeffamine T5000[4] | 40.50 | 34.00 | 29.50 | 24.00 |
| Clearlink 1000[5] | 25.00 | 20.50 | 21.00 | 21.50 |
| TiO$_2$[8] | 4.00 | 4.00 | 4.00 | 4.00 |
| Microgrit[10] WA 180TO | 20.00 | 40.00 | 40.00 | 40.00 |
| PETROLITE ™ 5000 T6[11] | 10.00 | 1.00 | 5.00 | 10.00 |
| DBTDL | 0.50 | 0.50 | 0.50 | 0.50 |
| Subtotal Weight | 100.00 | 100.00 | 100.00 | 100.00 |
| TOTAL WEIGHT | 200.00 | 200.00 | 200.00 | 200.00 |

| Ingredients | Example 17 Weight (grams) | Example 18 Weight (grams) | Example 19 Weight (grams) | Example 20 |
|---|---|---|---|---|
| "A" SIDE | | | | |
| Isocyanate functional prepolymer of Example F[1] | | 37.00 | | |
| Isocyanate functional prepolymer of Example B[1] | | 49.50 | | 43.60 |
| Isocyanate functional prepolymer of Example A[1] | 100.00 | | | |
| Isocyanate functional prepolymer of Example E[1] | | | 100.00 | |
| Isocyanate functional prepolymer of Example C[1] | | | | 42.00 |
| Tolonate HDT LV2[2] | | 6.19 | | |
| Desmodur XP2580[3] | | 7.31 | | 14.40 |
| Subtotal Weight | 100.00 | 100.00 | 100.00 | 100.00 |
| "B" SIDE | | | | |
| Jeffamine T5000[4] | 56.50 | 54.70 | 55.40 | 45.96 |
| Clearlink 1000[5] | 19.50 | 21.30 | 20.60 | 10.79 |
| Desmophen NH1420[6] | | | | 19.25 |
| Aerosil 200[7] | | | | |
| TiO$_2$[8] | 4.00 | 4.00 | 4.00 | 4.00 |
| Microgrit[10] WA 180TO | 10.00 | 10.00 | 10.00 | 10.00 |
| PETROLITE ™ 5000 T6[11] | 10.00 | 10.00 | 10.00 | 10.00 |
| DBTDL | | | | |
| Subtotal Weight | 100.00 | 100.00 | 100.00 | 100.00 |
| TOTAL WEIGHT | 200.00 | 200.00 | 200.00 | 200.00 |

[1] Illustrated in the Examples indicated.
[2] Available from Vencorex
[3] Available from INVISTA
[4] Available from Huntsman Corp.
[5] Available from Dorf Ketal
[6] Available from Covestro LLC
[7] Available from Evonik
[8] Available from DuPont
[9] Available from Elementis Specialties.
[10] Available from Micro Abrasives Corporation; Microgrit WCA 3 is alumina powder with a volume average particle size of 3 μm; Microgrit WA 360TO is alumina powder with a volume average particle size of 36 μm; Microgrit WA 180TO is alumina powder with a volume average particle size of 90 μm.
[11] Particulate copolymer of polyethylene and polypropylene with a volume average particle size of 5.0 to 7.5 μm, available from Baker Hughes "A" Side:

A total of 100 grams of isocyanate functional prepolymer was used. In some cases one or more pre-polymers were mixed to achieve the desired properties. The contents were kept at 60° C. prior to application in order to achieve spraying viscosities.

"B" Side:

The amine component was prepared from the ingredients listed in the above examples. In example 1 all the ingredients are mixed together with zircoa beads and ground in LAU mixer for 3 hours. In examples 2-20, a pre-paste was mixed using JEFFAMINE T5000 and $TiO_2$ in the desired ratios and ground in the LAU using zircoa beads for 3 hours. The paste was filtered and used to bring in the desired levels of $TiO_2$ and JEFFAMINE T5000 levels with the rest of the resin components. Alumina and/or PETROLITE 5000 T6 particles were then added and mixed using a Cowles blade.

Polyurea coating compositions of the invention were prepared by combining an isocyanate functional "A" side component and an amine functional "B" side component in the following manner:

Free films of the polyurea coating compositions were produced by charging the A and B sides in a double barreled syringe equipped with a static mix tube and a pneumatic applicator gun (available from Plas-Pak Industries) and injecting the components at a 1:1 ratio onto a polyethylene sheet and then immediately drawn down with Gardco Adjustable Micrometer Film Applicator at approximately 60-80 mils. Before testing the film properties (Young's Modulus, elongation, and glass transition temperature), the films rested for 1 day at 104° F.

Modulus and elongation properties were measured using an INSTRON 4443 with a pull rate of 50 mm/min. at room temperature (23° C.). The glass transition temperature was measured using TA Instruments 2980 DMA Dynamic Mechanical Analyzer. The DMA test parameters included tensile film mode, 20 μm amplitude, 1 Hz frequency, 40 cNm clamping force, and heating rate of 3° C./min.

Hardness values were determined by charging the A and B sides in a double barreled syringe equipped with a static mix tube and a pneumatic applicator gun and injecting the components at a 1:1 ratio into a mold to form a round "puck" approximately 6 cm in diameter and 0.2 cm in thickness. The puck was tested after resting for 1 day at 104° F. The hardness of the polyurea puck was measured with a Shore D Durometer (Pacific Transducer Corp. Model 212) at ambient conditions.

|  | Example 18 |
| --- | --- |
| Young's Modulus, MPa (ASTM D638-08) | 18.5 (23° C.) |
| % Elongation (ASTM D638-08) | 698 (23° C.) |
| Shore D Hardness (ASTM D2240) | 19-25 |
| Glass Transition Temperature (Tg) | 50° C. |

TABER Abrasion test: Coatings were applied onto primed panels by drawdown method and cut to 4"×4" pieces with a hole punched in the center. The panels were then weighed and mounted on a flat turntable platform that rotates on a vertical axis at a fixed speed (Taber Rotary Platform Abrasion Tester). Two Taber abrasive wheels, which are covered in sand paper (S-42 from Taber Industries) and applied at a specific pressure of two 1000 gram weights, were lowered onto the specimen surface. As the turntable rotated, the wheels were driven by the sample in opposite directions about a horizontal axis. Two 500 cycle runs (72 rpm) were done on each sample and the mass was recorded after each set of 500 cycles. The volume loss in cc was calculated using mass loss and density of the coating and plotted as shown in the table below for comparison.

TABLE 1

Alumina Particle size dependence shown in Control Example 1 and Comparative Examples 2-4

| EXAMPLE | Particle Size (μm) | cc Lost (Average) |
| --- | --- | --- |
| 1 | 0 | 0.71 |
| 2 | 3 | 0.72 |
| 3 | 36 | 0.62 |
| 4 | 90 | 0.56 |

As seen in Table 1, the volume loss due to abrasion decreased with increasing particle sizes for 0-90 microns. The application process, however, limits the size of particles that can be used as larger sizes can result in clogging nozzles of the spray gun. Therefore, in order to improve abrasion resistance even further a combination of inorganic and organic particles was used as shown in the table below.

TABLE 2

Concentration dependence. Examples 5-16

| Abrasive component composition | | Example | Taber abrasion resistance loss after 1000 cycles (cc) |
| --- | --- | --- | --- |
| 0% inorganic particles | 0% organic particles | 5 | 0.752 |
| 0% inorganic particles | 5% organic particles | 6 | 0.480 |
| 0% inorganic particles | 10% organic particles | 7 | 0.410 |
| 10% inorganic particles | 1% organic particles | 8 | 0.433 |
| 10% inorganic particles | 5% organic particles | 9 | 0.190 |
| 10% inorganic particles | 10% organic particles | 10 | 0.141 |
| 20% inorganic particles | 1% organic particles | 11 | 0.318 |
| 20% inorganic particles | 5% organic particles | 12 | 0.125 |
| 20% inorganic particles | 10% organic particles | 13 | 0.035 |
| 40% inorganic particles | 1% organic particles | 14 | 0.218 |
| 40% inorganic particles | 5% organic particles | 15 | 0.073 |
| 40% inorganic particles | 10% organic particles | 16 | 0.034 |

As can be seen in the Table 2 above, there was a general trend of improved abrasion resistance with increasing alumina concentration. The concentration limitation again was dependent on the application process where the higher than 40% led to gun clogging. It was also observed that organic particles improved abrasion resistance even when not used in combination with inorganic particles i.e. 0-10% organic particles at 0% inorganic particles. It was appreciated however that the combination of both particles significantly took abrasion resistance to very significant improvement i.e. as low as 0.034 cc loss. It should be noted again that the inorganic particles/organic particles combination concentration levels are limited by the process.

Traction testing: A Dynisco Polymer Test Coefficient of Friction tester was used to pull the sample across the surface of interest. A finished wood board was loaded onto the stage as the surface of interest in all examples. A coated polyurea traction plaque was attached to the measurement head, and the samples were placed polyurea-side down to contact the wood flooring board. A 300 gram weight was placed on top of the sample. The unit was run and measurements recorded by the computer attached, as the sample was pulled along the surface of the board to give a dynamic coefficient of friction.

Deionized water was applied on the surface of the board and the measurement repeated to determine the dynamic coefficient of friction on a wet surface. The data was analyzed by JMP software and plotted in the figure below to give a comparison. The numbers generated by different polyurea coatings were compared to the numbers generated by a rubber piece of the same area tested similarly to serve as a control.

TABLE 3

Dry traction on wooden surface. Examples 17&18

| Example | Coefficient of Friction (Dry) |
|---|---|
| 18 | 1.70 (average) |
| 17 | 1.81 (average) |
| Rubber | 0.80 (average) |

The dynamic coefficient of fraction numbers generated by polyurea are slightly better than the control as seen in Table 3. The surface was then wetted with deionized water and the same samples were run in a similar way to generate wet DCOF numbers as shown in Table 4 below.

TABLE 4

Traction on wet wooden surface. Examples 17&18

| Example | Coefficient of Friction (Wet) |
|---|---|
| 18 | 0.85 (average) |
| 17 | 0.85 (average) |
| Rubber | 0.59 (average) |

It was observed that the DCOF number on wet wood surface were lower than those on dry surface. The DCOF numbers of polyurea samples however were comparable or slightly better than those of rubber control.

Adhesion testing: The substrates were cleaned using heptane and plasma treated to remove contaminants. OneChoice adhesion promoter available from PPG industries was used as described in its technical data sheet to improve adhesion on plastic substrates. It was observed that example 20 can be used as a tie-layer between the substrate and a cured polyurea film to give highly improved adhesion to plastics.

What is claimed is:

1. A curable film-forming coating composition comprising:
   (a) an isocyanate-functional prepolymer having a weight average molecular weight of 4000 to 15,000, wherein the isocyanate-functional prepolymer comprises (i) a reaction product of a polyisocyanate and a polyamine having primary and/or secondary amino groups; and/or (ii) a reaction product of a polyisocyanate and a polyol;
   (b) a curing agent comprising a mixture of polyamines, wherein at least one polyamine in the curing agent has an amine equivalent weight of 125 to 250; and
   (c) an abrasion resistant additive comprising organic and inorganic particles, wherein the organic particles demonstrate a volume average particle size of 5 to 7.5 microns, and the inorganic particles demonstrate a volume average particle size of at least 90 microns.

2. The curable film-forming coating composition according to claim 1 wherein the polyisocyanate used to prepare the isocyanate-functional prepolymer is aliphatic.

3. The curable film-forming coating composition according to claim 1 wherein isocyanate-functional prepolymer has an isocyanate equivalent weight greater than 300.

4. The curable film-forming coating composition according to claim 1, wherein the isocyanate-functional prepolymer comprises a reaction product of a polyisocyanate and a polyether having primary amino groups.

5. The curable film-forming coating composition according to claim 1, wherein the curing agent comprises 5 to 50 percent by weight of an aliphatic polyamine having an amine equivalent weight of 125 to 250, and 50 to 95 percent by weight of an aliphatic polyamine having an amine equivalent weight of 900 to 2500.

6. The curable film-forming coating composition according to claim 1, wherein the organic and inorganic particles of the abrasion resistant additive comprise chemically inert, untreated and uncoated particles.

7. The curable film-forming coating composition according to claim 1, wherein the abrasion resistant additive is present in the composition in an amount of at least 10 percent by weight, based on the total weight of solids in the composition.

8. The curable film-forming coating composition according to claim 1, wherein the inorganic particles comprise untreated alumina, and the organic particles comprise polyethylene, polypropylene, and/or saturated, linear primary alcohols with an average carbon chain length of $C_{20}$ to $C_{50}$.

9. A coated substrate comprising:
   A) a substrate having at least one coatable surface, and
   B) a coating layer formed from a film-forming composition applied to at least one surface of the substrate and cured thereon, wherein the film-forming composition is prepared from;
   (a) an isocyanate-functional prepolymer having a weight average molecular weight of 4000 to 15,000, wherein the isocyanate-functional prepolymer comprises (i) a reaction product of a polyisocyanate and a polyamine having primary and/or secondary amino groups; and/or (ii) a reaction product of a polyisocyanate and a polyol;
   (b) a curing agent comprising a mixture of polyamines, wherein at least one polyamine in the curing agent has an amine equivalent weight of 125 to 250; and
   (c) an abrasion resistant additive comprising organic and inorganic particles, wherein the organic particles demonstrate a volume average particle size of 5 to 7.5 microns, and the inorganic particles demonstrate a volume average particle size of at least 90 microns.

10. The coated substrate according to claim 9, wherein the substrate comprises wood, metal, glass, fabric, leather, a composite, or a polymeric material.

11. The coated substrate according to claim 10, wherein the substrate comprises a plasma-treated surface adjacent to the coating layer formed from the film-forming composition.

12. The coated substrate according to claim 10, further comprising an adhesive layer disposed between the substrate (A) and the coating layer (B), wherein the adhesive layer comprises an adhesion promoter.

13. A footwear component wherein the component is prepared from a curable composition comprising:
  (a) an isocyanate-functional prepolymer having a weight average molecular weight of 4000 to 15,000, wherein the isocyanate-functional prepolymer comprises (i) a reaction product of a polyisocyanate and a polyamine having primary and/or secondary amino groups; and/or (ii) a reaction product of a polyisocyanate and a polyol;
  (b) a curing agent comprising a mixture of polyamines, wherein at least one polyamine in the curing agent has an amine equivalent weight of 125 to 250; and
  (c) an abrasion resistant additive comprising organic and inorganic particles, wherein the organic particles demonstrate a volume average particle size of 5 to 7.5 microns, and the inorganic particles demonstrate a volume average particle size of at least 90 microns.

14. The footwear component according to claim 13 wherein the abrasion resistant additive is present in the composition in an amount of at least 10 percent by weight, based on the total weight of solids in the composition.

15. The footwear component according to claim 13 wherein the inorganic particles comprise untreated alumina, and the organic particles comprise polyethylene, polypropylene, and/or saturated, linear primary alcohols with an average carbon chain length of $C_{20}$ to $C_{50}$.

16. The footwear component according to claim 13 wherein said footwear component demonstrates a dry film thickness of 508 to 25400 microns and the weight ratio of organic to inorganic particles in the abrasion resistant additive is less than 10:40.

17. The footwear component according to claim 13 wherein said footwear component demonstrates a dry film thickness of 25.4 to 254 microns and the weight ratio of organic to inorganic particles in the abrasion resistant additive is at least 40:10.

18. The footwear component according to claim 13 wherein the curable composition further comprises an adhesion promoter.

19. A footwear comprising the footwear component according to claim 13.

* * * * *